(12) United States Patent
Ekwuribe et al.

(10) Patent No.: US 6,835,802 B2
(45) Date of Patent: Dec. 28, 2004

(54) METHODS OF SYNTHESIZING SUBSTANTIALLY MONODISPERSED MIXTURES OF POLYMERS HAVING POLYETHYLENE GLYCOL MOIETIES

(75) Inventors: Nnochiri N. Ekwuribe, Cary, NC (US); Christopher H. Price, Chapel Hill, NC (US); Aslam M. Ansari, Rockville, MD (US); Amy L. Odenbaugh, Morrisville, NC (US)

(73) Assignee: Nobex Corporation, Durham, NC (US)

( * ) Notice: Subject to any disclaimer, the term of this patent is extended or adjusted under 35 U.S.C. 154(b) by 199 days.

(21) Appl. No.: 09/873,731

(22) Filed: Jun. 4, 2001

(65) Prior Publication Data

US 2003/0004304 A1 Jan. 2, 2003

(51) Int. Cl.[7] .............................. C08G 65/34; C08J 3/02
(52) U.S. Cl. ........................ 528/425; 528/373; 528/391; 528/396; 568/613; 568/622; 574/155; 574/167
(58) Field of Search .................................. 528/425, 373, 528/396, 391; 568/613, 622; 524/155, 167

(56) References Cited

U.S. PATENT DOCUMENTS

| | | |
|---|---|---|
| 3,256,153 A | 6/1966 | Heimlech |
| 3,868,356 A | 2/1975 | Smyth |
| 3,919,411 A | 11/1975 | Glass et al. |
| 3,950,517 A | 4/1976 | Lindsay et al. |
| 4,003,792 A | 1/1977 | Mill et al. |
| 4,044,196 A | 8/1977 | Huper et al. |
| 4,087,390 A | 5/1978 | Shields |
| 4,093,574 A | 6/1978 | Shields |
| 4,100,117 A | 7/1978 | Shields |
| 4,179,337 A | 12/1979 | Davis et al. |
| 4,223,163 A | 9/1980 | Guilloty ..................... 568/618 |
| 4,229,438 A | 10/1980 | Fujino et al. |
| 4,253,998 A | 3/1981 | Sarantakis |
| 4,277,394 A | 7/1981 | Fujino et al. |
| 4,338,306 A | 7/1982 | Kitao et al. |

(List continued on next page.)

FOREIGN PATENT DOCUMENTS

| | | |
|---|---|---|
| EP | 0 031 567 | 7/1981 |
| EP | 0 597 007 | 10/1996 |
| EP | 0 621 777 | 11/1996 |

(List continued on next page.)

OTHER PUBLICATIONS

International Search Report corresponding to PCT/US 02/17619; data of mailing: Aug. 7, 2002.

(List continued on next page.)

Primary Examiner—Duc Truong
(74) Attorney, Agent, or Firm—Myers Bigel Sibley & Sajovec; William A. Barrett

(57) ABSTRACT

Methods of synthesizing a substantially monodispersed mixture of polymers comprising polyethylene glycol moieties include:

reacting a substantially monodispersed mixture of compounds having the structure of Formula I:

$$R^1(OC_2H_4)_n—O^-X^+ \qquad (I)$$

wherein $R^1$ is H or a lipophilic moiety; n is from 1 to 25; and $X^+$ is a positive ion,
with a substantially monodispersed mixture of compounds having the structure of Formula II:

$$R^2(OC_2H_4)_m—OMs \qquad (II)$$

wherein $R^2$ is H or a lipophilic moiety; and m is from 1 to 25, under conditions sufficient to provide a substantially monodispersed mixture of polymers comprising polyethylene glycol moieties and having the structure of Formula III:

$$R^2(OC_2H_4)_{m+n}—OR^1 \qquad (III).$$

41 Claims, 3 Drawing Sheets

U.S. PATENT DOCUMENTS

| | | |
|---|---|---|
| 4,348,387 A | 9/1982 | Brownlee et al. |
| 4,410,547 A | 10/1983 | Ueno et al. |
| 4,469,681 A | 9/1984 | Brownlee et al. |
| 4,472,382 A | 9/1984 | Labrie et al. |
| 4,554,101 A | 11/1985 | Hopp |
| 4,579,730 A | 4/1986 | Kidron et al. |
| 4,585,754 A | 4/1986 | Meisner et al. |
| 4,622,392 A | 11/1986 | Hong et al. |
| 4,684,524 A | 8/1987 | Eckenhoff et al. |
| 4,698,264 A | 10/1987 | Steinke |
| 4,717,566 A | 1/1988 | Eckenhoff et al. |
| 4,744,976 A | 5/1988 | Snipes et al. |
| 4,772,471 A | 9/1988 | Vanlerberghe et al. |
| 4,797,288 A | 1/1989 | Sharma et al. |
| 4,801,575 A | 1/1989 | Pardridge |
| 4,839,341 A | 6/1989 | Massey et al. |
| 4,840,799 A | 6/1989 | Appelgren et al. |
| 4,849,405 A | 7/1989 | Ecanow |
| 4,917,888 A | 4/1990 | Katre et al. |
| 5,099,074 A | 3/1992 | Mueller et al. ............ 568/617 |
| 5,122,614 A | 6/1992 | Zalipsky |
| 5,298,410 A | 3/1994 | Phillips et al. |
| 5,405,621 A | 4/1994 | Sipos |
| 5,320,840 A | 6/1994 | Camble et al. |
| 5,324,775 A | 6/1994 | Rhee et al. |
| 5,328,955 A | 7/1994 | Rhee et al. |
| 5,349,052 A | 9/1994 | Delgado et al. |
| 5,359,030 A | 10/1994 | Ekwuribe |
| 5,405,877 A | 4/1995 | Greenwald et al. |
| 5,413,791 A | 5/1995 | Rhee et al. |
| 5,415,872 A | 5/1995 | Sipos |
| 5,428,128 A | 6/1995 | Mensi-Fattohi et al. |
| 5,438,040 A | 8/1995 | Ekwuribe |
| 5,444,041 A | 8/1995 | Owen et al. |
| 5,446,091 A | 8/1995 | Rhee et al. |
| 5,457,066 A | 10/1995 | Frank et al. |
| 5,461,031 A | 10/1995 | De Felippis |
| 5,468,478 A | 11/1995 | Saifer et al. |
| 5,504,188 A | 4/1996 | Baker et al. |
| 5,506,203 A | 4/1996 | Backstrom et al. |
| 5,518,998 A | 5/1996 | Backstrom et al. |
| 5,523,348 A | 6/1996 | Rhee et al. |
| 5,529,915 A | 6/1996 | Phillips et al. |
| 5,545,618 A | 8/1996 | Buckley et al. |
| 5,550,188 A | 8/1996 | Rhee et al. |
| 5,567,422 A | 10/1996 | Greenwald |
| 5,597,797 A | 1/1997 | Clark et al. |
| 5,606,038 A | 2/1997 | Regen |
| 5,612,460 A | 3/1997 | Zalipsky |
| 5,631,347 A | 5/1997 | Baker et al. |
| 5,637,749 A | 6/1997 | Greenwald |
| 5,643,575 A | 7/1997 | Martinez et al. |
| 5,646,242 A | 7/1997 | Baker et al. |
| 5,650,388 A | 7/1997 | Shorr et al. |
| 5,658,878 A | 8/1997 | Backstrom et al. |
| 5,681,567 A | 10/1997 | Baker et al. |
| 5,681,811 A | 10/1997 | Ekwuribe |
| 5,693,609 A | 12/1997 | Baker et al. |
| 5,693,769 A | 12/1997 | Kahne et al. |
| 5,700,904 A | 12/1997 | Baker et al. |
| 5,707,648 A | 1/1998 | Yiv |
| 5,714,639 A | 2/1998 | Bowman et al. ............ 568/620 |
| 5,738,846 A | 4/1998 | Greenwald et al. |
| 5,747,445 A | 5/1998 | Backstrom et al. |
| 5,854,208 A | 12/1998 | Jones et al. |
| 5,889,153 A | 3/1999 | Suzuki et al. |
| 5,969,040 A | 10/1999 | Hallahan et al. |
| 5,981,709 A | 11/1999 | Greenwald et al. |
| 5,985,263 A | 11/1999 | Lee et al. |
| 6,004,574 A | 12/1999 | Backstrom et al. |
| 6,011,008 A | 1/2000 | Domb et al. |
| 6,025,325 A | 2/2000 | Campfield et al. |
| 6,034,054 A | 3/2000 | De Felippis et al. |
| 6,042,822 A | 3/2000 | Gilbert et al. |
| 6,043,214 A | 3/2000 | Jensen et al. |
| 6,051,551 A | 4/2000 | Hughes et al. |
| 6,057,292 A | 5/2000 | Cunningham et al. |
| 6,063,761 A | 5/2000 | Jones et al. |
| 6,093,391 A | 7/2000 | Kabanov et al. |
| 6,113,906 A | 9/2000 | Greenwald et al. |
| 6,165,976 A | 12/2000 | Backstrom et al. |
| 6,177,087 B1 | 1/2001 | Greenwald et al. |
| 6,191,105 B1 | 2/2001 | Ekwuribe et al. |
| 6,200,602 B1 | 3/2001 | Watts et al. |
| 6,211,144 B1 | 4/2001 | Havelund |
| 6,248,363 B1 | 6/2001 | Patel et al. |
| 6,251,856 B1 | 6/2001 | Markussen et al. |
| 6,258,377 B1 | 7/2001 | New et al. |
| 6,268,335 B1 | 7/2001 | Brader |
| 6,306,440 B1 | 10/2001 | Backstrom et al. |
| 6,309,633 B1 | 10/2001 | Ekwuribe et al. |
| 6,310,038 B1 | 10/2001 | Havelund |
| 6,323,311 B1 | 11/2001 | Liu et al. |
| 6,335,316 B1 | 1/2002 | Hughes et al. |
| 6,342,225 B1 | 1/2002 | Jones et al. |
| 6,506,730 B1 | 1/2003 | Lee et al. |
| 2002/0160938 A1 | 10/2002 | Brandenberg et al. |
| 2003/0027748 A1 | 2/2003 | Ekwuribe et al. |
| 2003/0027995 A1 | 2/2003 | Ekwuribe et al. |
| 2003/0050228 A1 | 3/2003 | Ekwuribe et al. |
| 2003/0060606 A1 | 3/2003 | Ekwuribe et al. |
| 2003/0069170 A1 | 4/2003 | Soltero et al. |
| 2003/0083232 A1 | 5/2003 | Soltero et al. |
| 2003/0087808 A1 | 5/2003 | Soltero et al. |
| 2003/0144468 A1 | 7/2003 | Ekwuribe et al. |

FOREIGN PATENT DOCUMENTS

| | | | |
|---|---|---|---|
| EP | 0797615 B1 | 1/1997 | |
| EP | 0 822 218 A2 | 2/1998 | |
| EP | 0822218 A2 | 2/1998 | .......... C08G/77/46 |
| GB | 1 492 997 | 11/1977 | |
| JP | 01207320 | 8/1989 | .......... C08G/65/40 |
| JP | 1 254 699 | 10/1989 | |
| WO | WO93/01802 | 2/1993 | |
| WO | WO95/09831 | 4/1995 | |
| WO | WO95/30641 | 11/1995 | |
| WO | WO 97/14740 | 4/1997 | |
| WO | WO98/07745 | 2/1998 | |
| WO | WO99/32134 | 7/1999 | |
| WO | WO99/65941 | 12/1999 | |
| WO | WO 01/12230 | 2/2001 | |

OTHER PUBLICATIONS

Coudert et al., "A Novel, Unequivocal Synthesis of Polyethylene Glycols," *Synthetic Communications*, 16(1): 19–26 (1986).

Y. Chen & G. Baker, "Synthesis and Properties of AMA Amphiphiles," *J. Org. Chem.*, 64: 6870–6873 (1999).

J. Milton Harris, "Laboratory Synthesis of Polyethylene Glycol Derivatives," *J. Macromol. Science—Rev. Macromol. Chem. Phys.*, C25(3): 325–373 (1985).

Abuchowski, A. and F. F. Davis "Soluble Polymer–Enzyme Adducts," pp. 368–383, Enzymes as Drugs, J. S. Holcenberg, John Wiley (1981).

Agarwal et al. "Polymethyacrylate–based Microparticulates of Insulin for Oral Delivery: Preparation and In Vitro Dissolution Stability in the Presence of Enzyme Inhibitors" *International Journal of Pharmaceutics* 225:31–39 (2001).

Akiyama, M. et al. "The Synthesis of New Derivatives of 1-.β.–D–Arabinofuranosylcytosine" *Chem. Pharm. Bull.* 26(3):981–984 (1978).

Allaudeen et al. "Orally Active Insulin: A Single Insulin Conjugate Selected for Future Studies" 60th Annual Meeting of the American Diabetes Assoc., Atlanta, GA, Jun. 2000 (Abstract).

Allock and Lampe "Contemporary Polymer Chemistry," 394–403 ($2^{nd}$ ed., 1991).

Anderson et al. "HIM2, a Novel Modified Insulin, has Improved Systemic Pharmacokinetics in Normal Dogs, Compared to Unmodified Insulin" American Diabetes Association 62nd Annual Meeting, Jun. 2002 (Abstract).

Ansell, S. et al. "Application of Oligo–(14–amino–3,6,9, 12–tetraoxatetradecanoic acid) Lipid Conjugates as Steric Barrier Molecules in Liposomal Formulations" *Bioconjugate Chem.*, 10:653–666 (1999).

Aoshima, M. et al. "$N^4$–Behenoyl–1–β–D–Arabinofuranosylcytosine as a Potential New Antitumor Agent" *Cancer Research* 37:2481–2486 (1977).

Baker, D. C. et al. "Prodrugs of 9–β–D–Arabinofuranosyladenine. 1. Synthesis and Evaluation of Some 5'–(O–Acyl) Derivatives" *J. Med. Chem.* 21(12):1218–1221 (1978).

Banting et al. "Pancreatic Extracts in the Treatment of Diabetes Mellitus: Preliminary Report" *Can. Med. Assoc. J.* 145(10):1281–1286 (1991).

Banting et al. "Pancreatic Extracts in the Treatment of Diabetes Mellitus" *Can. Med. Assoc. J.* 12:141–146 (1992).

Baudys et al. "Stabilization and Intestinal Absorption of Human Calcitonin" *J. Contr. Rel.* 39:145–51 (1996).

Baudys, M. et al. "Synthesis and Characterization of Different Glycosylated Derivatives of Insulin" *Proceed. Intern. Symp. Cont. Rel. Bioactive. Mater.* 19:210–211 (1992).

Block, Lawrence H. "Pharmaceutical Emulsions and Microemulsions" *Pharmaceutical Dosage Forms: Disperse Systems*, vol. 2, Ed. Lieberman et al. (1996).

Boccu, E. et al. "Pharmacokinetic Properties of Polyethylene Glycol Derivatized Superoxide Dismutase" *Pharm. Res. Comm.* 14:113–120 (1982).

Bone et al. "Successful Treatment of an Insulin Dependent Rat Model of Human Type I Diabetes with Orally Active Insulin" Program and Abstracts, 4th International Workshop on Lessons from Animal Diabetes, Omiya, Japan, Nov. 1994 (Abstract).

Bone et al. "Successful Treatment of Type 1 Diabetes with Orally–Active Insulin: Studies in The Insulin Dependent BB/S Rat" Program and Abstracts, 55th Annual Meeting of the American Diabetes Association, Atlanta Georgia, Jun. 1995 (Abstract).

Brange and Volund "Insulin Analogs with Improved Pharmacokinetic Profiles" *Advanced Drug Delivery Reviews* 35:307–335 (1999).

Brange, J. et al. "Chemical Stability of Insulin. 1. Hydrolytic Degradation During Storage of Pharmaceutical Preparations" *Pharm. Res.* (6):715–726 (1992).

Brange, J. et al "Chemical Stability of Insulin. 2. Formation of Higher Molecular Weight Transformation Products During Storage of Pharmaceutical Preparations" *Pharm. Res.* 9(6):727–734 (1992).

Brange, J. "Galenics of Insulin: The Physico–Chemical and Pharmaceutical Aspects of Insulin and Insulin Preparations" Novo Research Institute, Denmark, 18–100 (1987).

Chien, Y. W., Novel Drug Delivery Systems, pp. 678–679, Marcell Deffer, Inc., New York, N.Y., 1992.

Cleland et al. "Emerging Protein Delivery Methods" *Current Opinion in Biotechnology* 12:212–219 (2001).

Clement et al. "Effects of Multiple Doses of Orally Administered Hexyl Insulin M2(HIM2) on Postprandial Blood Glucose (PPG) Concentrations in Type 1 Diabetic (T1) Patients" American Diabetes Association 62nd Annual Meeting, Jun. 2002 (Poster).

Clement et al. "Oral Insulin Product Hexyl–Insulin Monoconjugate 2 (HIM2) in Type 1 Diabetes Mellitus: The Glucose Stabilization Effects of HIM2" *Diabetes Technology & Therapeutics* 4(4):459–466 (2002).

Clement, Stephen "A Dose–Escalation Study of the Effects of Two Sequential Doses of Oral Modified Insulin on Blood Glucose Concentrations in Patients with Type 1 Diabetes Mellitus" American Diabetes Association Annual Meeting (Jun. 25, 2001) (Abstract).

Conradi, R.A., et al. "The Influence of Peptide Structure on Transport Across Caco–2 Cells" *Pharm. Res.* 8(12):1453–1459 (1991).

Coombes, A.G.A. et al. "Biodegradable Polymeric Microparticles for Drug Delivery and Vaccine Formulation: the Surface Attachment of Hydrophilic Species Using the Concept of Poly(Ethylene Glycol) Anchoring Segments" *Biomaterials*, 18:1153–1161 (1997).

Damge et al. "Poly(alkyl cyanoacrylate) Nanospheres for Oral Administration of Insulin" *Journal of Pharmaceutical Sciences* 86(12):1403–1409 (Dec. 1997).

Dandona et al. "Effect of an Oral Modified Insulin on Blood Glucose Levels in Fasting and Fed Type 1 Diabetic Patients Receiving a 'Basal' Regimen of Injected Insulin" American Diabetes Association Annual Meeting (Jun. 25, 2001) (Abstract).

Delgado et al. "The Uses and Properties of PEG–Linked Proteins" *Critical Reviews in Therapeutic Drug Carrier Systems* 9(3):249–304 (1992).

Ekwuribe, Nnochiri "Conjugation–Stabilized Polypeptide Compositions, Therapeutic Delivery and Diagnostic Formulations Comprising Same, and Method of Making and Using the Same" *Biotechnology Advances* 14(4):575–576 (1996) (Abstract).

Engel et al. "Insulin: Intestinal Absorption as Water–in–Oil–in–Water Emulsions" *NATURE* 219:856–857 (1968).

Fasano, Alessio "Innovative strategies for the oral delivery of drugs and peptides" *TIBTECH* 16:152–157 (1998).

Forst et al. "New Aspects on Biological Activity of C–peptide in IDDM Patients," *Exp. Clin. Endocrinol. Diabetes* 106:270–276 (1998).

Gish, D. T. et al. "Nucleic Acids. 11. Synthesis of 5'–Esters of 1–β–D–Arabinofuranosylcytosine Possessing Antileukemic and Immunosuppressive Activity" *J. Med. Chem.* 14(12):1159–1162 (1971).

Gombotz, W. & D. Pettit "Biodegradable Polymers for Protein and Peptide Drug Delivery" *Bioconjugate Chem.*, 6:332–351 (1995).

Hashimoto et al. "Synthesis of Palmitoyl Derivatives of Insulin and Their Biological Activities" *Pharmaceutical Research*, 6(2):171–176 (1989).

Hinds et al. "Synthesis and Characterization of Poly(ethylene glycol)–Insulin Conjugates" *Bioconjugate Chem.* 11:195–201 (2000).

Hong, C.I. et al. "Nucleoside Conjugates. 7. Synthesis and Antitumor Activity of 1–β–D–Arabinofuranosylcytosine Conjugates of Ether Lipids" *J. Med. Chem* 29:2038–2044 (1986).

Hostetler, K. Y. et al. "Synthesis and Antiretroviral Activity of Phospholipid Analogs of Azidothymidine and Other Antiviral Nucleosides" *The Journal of Biological Chemistry* 265(11):6112–6117 (1990).

Igarashi, R. et al. "Biologically Active Peptides Conjugated with Lecithin for DDS" *Proceed. Intern. Symp. Cont. Rel. Bioactiv. Mater.* 17:367–368 (1990).

Kemmler et al. "On the Nature and Subcellular Localization of the Proinsulin Converting Enzymes" *Federation Proceedings* 30(Abstract 924):1210 Abs (1971).

Kemmler et al. "Studies on the Conversion of Proinsulin to Insulin: I. Converison in Vitro with Trypsin and Carboxypeptidase B" *The Journal of Biological Chemistry* 246(22):6786–6791 (Nov. 25, 1971).

King et al. "Preparation of Protein Conjugates with Alkoxypolyethylene Glycols" *Int. J. Peptide Protein Res.* 16:147–155 (1980).

Kipnes et al. "Control of Postprandial Plasma Glucose by an Oral Insulin Product (HIM2) in Patients with Type 2 Diabetes" *Emerging Treatments and Technologies* 26:2 (2003).

Kipnes et al. "The Effects of an Oral Modified Insuling on Postprandial Blood Glucose Levels in Patients with Type 2 Diabetes" American Diabetes Association Annual Meeting (Jun. 24, 2001) (Abstract).

Kipnes et al. "The Effects of an Oral Modified Insulin on Postprandial Blood Glucose Levels in Patients with Type 2 Diabetes Mellitus" American Diabetes Association Annual Meeting (Jun. 24, 2001) (Poster).

Kube, D.M. "Multitalented Proteins Play a Key Role in Therapeutics" *Genomics and Proteomics* (Sep. 2002).

M. Maislos et al. "The Source of the Circulating Aggregate of Insulin in Type I Diabetic Patients in Therapeutic Insulin" *J. Clin. Invest.* 77:717–723 (1986).

M. Savva & L. Huang, "Effect of PEG Homopolymer and Grafted Amphiphilic PEG–Palmityl on the Thermotropic Phase Behavior of 1,2–Dipalmitoyl–SN–Glycero–3–Phosphocholine Bilayer" *Journal of Liposome Research* 9(3):357–365 (1999).

Marschutz et al. "Oral Peptide Drug Delivery: Polymer–Inhibitor Conjugates Protecting Insulin from Enzymatic Degradation In Vitro" *Biomaterials* 21:1499–1507 (2000).

Musabayane et al. "Orally Administered, Insulin–Loaded Amidated Pectin Hydrogel Beads Sustain Plasma Concentrations of Insulin in Streptozotocin–Diabetic Rats" Journal of Endocrinology 164:1–6 (2000).

Nucci et al. "The Therapeutic Value of Poly(ethylen Glycol)—Modified Proteins" *Ac. Drug. Del. Rev.* 6:133–151 (1991).

Oka, K. et al. "Enhanced Intestinal Absorption of a Hydrophobic Polymer–conjugated Protein Drug, Smancs, in an Oily Formulation" *Pharm. Res.* 7(8):852–855 (1990).

Pang, David C. "Bridging Gaps in Drug Discovery and Development" *Pharmaceutical Technology* 82–94 (Nov.1998).

Patel et al. "Oral Administration of Insulin By Encapsulation Within Liposomes" *FEBS Lett.* 62(1):60–63 (1976).

Price, JC, *Polyethlyene Glycol*, 355–361.

Puskas et al. "Investigation of Chymotrypsin Digestion Profile of Orally Active Insulin Conjugate HIM2" *AAPS Pharm. Sci.* 3(3) (2001) (Abstract).

Radhakrishnan et al. "Chemical Modification of Insulin with Amphiphilic Polymers Improves Intestinal Delivery" *Proceed. Intl. Symp. Control. Rel. Bioact. Mater.* 25:124–125 (1998) (Abstract).

Radhakrishnan et al. "Oral Delivery of Insulin: Single Selective Modification at B29–LYS With Amphiphilic Oligomer" Program and Abstracts, 1999 National Meeting of the Ameri. Assoc. Pharm. Scient., New Orleans, LA (1999) (Abstract).

Radhakrishnan et al. "Structure–Activity Relationship of Insulin Modified with Amphiphilic Polymers" Program and Abstracts, 1998 National Meeting of the Amer. Assoc. Pharm. Scient., San Francisco, CA *Pharm. Sci.* 1(1):S–59 (1998) (Abstract).

Ratner, R. E. et al. "Persistent Cutaneous Insulin Allergy Resulting from High–Molecular Weight Insulin Aggregates" *Diabetes* 39:728–733 (1990).

Richards et al. "Self–Association Properties of Monomeric Insulin Analogs Under Formulation Conditions" *Pharmaceutical Research* 15(9):1434–1441 (1998).

Robbins, D. C. et al. "Antibodies to Covalent Aggregates of Insulin in Blood of Insulin–Using Diabetic Patients" *Diabetes* 36:838–841 (1987).

Russell–Jones, G. J. "Vitamin B12 Drug Delivery" *Proceed. Intern. Symp. Control. Rel. Bioactive. Mater.* 19:102–103 (1992).

Saffran et al. "A Model for the Study of the Oral Administration of Peptide Hormones" *Can. J. Biochem.* 57:548–553 (1979).

Saffran, M. et al. "A New Approach to the Oral Administration of Insulin and Other Peptide Drugs" *Science* 233:1081–1084 (1986).

Santiago, N. et al. "Oral Immunization of Rats with Influenza Virus M Protein (M1) Microspheres" *Proceed. Intern. Symp. Cont. Rel. Bioactive. Mater.* 19:116–117 (1992).

Shah and Shen "Transcellular Delivery of an Insulin–Transferrin Conjugate in Enterocyte–like Caco-2 Cells" *Journal of Pharmaceutical Sciences* 85(12):1306–1311 (1996).

Shichiri et al. "Enteral Absorption of Water–in–Oil–in–Water Insulin Emulsions in Rabbits" *Diabetologia* 10:317–321 (1974).

Still and McAllister "Effects of Orally Active Modified Insulin in Type 1 Diabetic Patients" *Clinical Pharmacol. Therap.* 69(2):P95 (Feb. 2001) (Abstract).

Still and McAllister "Effects of Orally Active Modified Insulin in Type I Diabetic Patients" 2001 Annual Meeting of the American Society for Clinical Pharmacology & Therapeutics, Orlando, FL, Mar. 9, 2001 (Handout).

Still et al. "Magnitude and Variability of Pharmacokinetic and Glucodynamic Responses to Modified Human Insulin Administered Orally to Healthy Volunteers" *Diabetes Research and Clinical Practice* 56:S77 (2002) (Abstract).

Still, J. Gordon "Development of Oral Insulin: Progress and Current Status" *Diabetes/Metabolism Research and Reviews*, 18(1):S29–S37 (2002).

Szleifer, I. et al. "Spontaneous Liposome Formation Induced by Grafted Poly(Ethylene Oxide) Layers: Theoretical Prediction and Experimental Verification" *Proceedings of the National Academy of Sciences of the United States of America* 95(3):1032–1037 (Feb. 3, 1998).

Taniguchi, T. et al. "Synthesis of Acyloyl Lysozyme and Improvement of its Lymphatic Transport Following Small Intestinal Administration in Rats" *Proceed. Intern. Symp. Control. Rel. Bioactiv. Mater.* 19:104–105 (1992).

Tyle, Praveen "Iontophoretic Devices for Drug Delivery" *Pharmaceutical Research*, 3(6);318–326 (1986).

Uchio et al. "Site–Specific Insulin Conjugates with Enhanced Stability and Extended Action Profile" *Advanced Drug Delivery Reviews* 35:289–306 (1999).

Vreeland et al. "Molar Mass Profiling of Synthetic Polymers by Free–Solution Capillary Electrophoresis of DNA–Polymer Conjugates" *Analytical Chemistry* 73(8):1795–1803 (Apr. 15, 2001).

Wahren et al. "Role of C–peptide in Human Physiology" *Am. J. Physiol. Endocrinol. Metab.* 278:E759–E768 (2000).

Zalipsky, S. et al. "Attachment of Drugs to Polyethylene Glycols" *Eur. Polym. J.* 19(12):1177–1183 (1983).

Ziv and Bendayan "Intestinal Absorption of Peptides Through the Enterocytes" *Microscopy Research and Technique* 49:346–352 (2000).

Still et al., *Methods of Reducing Hypoglycemic Episodes in the Treatment of Diabetes Mellitus*, U.S. Ser. No. 10/461,199, filed Jun. 13, 2003.

Radhakrishnan et al., *Insulin Polypeptide–Oligomer Conjugates, Proinsulin Polypeptide–Oligomer Conjugates and Methods of Synthesizing Same*, U.S. Ser. No. 10/389,499, filed Mar. 17, 2003.

Soltero et al., *Pharmaceutical Compositions of Insulin Drug–Oligomer Conjugates and Methods of Treating Diseases Therewith*, U.S. Ser. No. 10/382,155, filed Mar. 5, 2003.

Soltero et al., *Pharmaceutical Compositions of Drug–Oligomer Conjugates and Methods of Treating Diseases Therewith*, U.S. Ser. No. 10/382,069, filed Mar. 5, 2003.

Soltero et al., *Insulin Polypeptide–Oligomer Conjugates, Proinsulin Polypeptide–Oligomer Conjugates and Methods of Synthesizing Same*, U.S. Ser. No. 10/382,022, filed Mar. 5, 2003.

Ekwuribe et al., *Calcitonin Drug–Oligomer Conjugates, and Uses Thereof*, U.S. Ser. No. 10/166,355, filed Nov. 8, 2002, including Preliminary Amendment dated Feb. 26, 2003 and Supplemental Preliminary Amendment dated Mar. 31, 2003.

Ekwuribe et al., *Mixtures of Drug–Oligomer Conjugates Comprising Polyalkylene Glycol, Uses Thereof, and Methods of Making Same*, U.S. Ser. No. 09/873,797, filed Jun. 4, 2001.

Francis, G.E., et al., *Polyethylene Glycol Modification: Relevance of Improved Methodology to Tumour Targeting*, Journal of Drug Targeting, vol. 3, pp. 321–340 (1996).

Guzman, Angel, et al., *Effects of Fatty Ethers and Stearic Acid of the Gastrointestinal Absorption of Insulin*, PRHSJ, vol. 9, No. 2, pp. 155–159 (Aug. 1990).

Krishnan, B. Radha, et al., *Stability and Physical Characteristics of Orally Active Amphiphilic Human Insulin Analog, Methoxy (Polyethylene Glycol) Hexanoyl Human Recombinant Insulin (HIM2)*, Proceed. Int'l. Symp. Control. Rel. Bioact. Mater., vol. 27, pp. 1038–1039 (2000).

Lindsay, D.G., et al., *The Acetylation of Insulin*, Biochem J., vol. 121, pp. 737–745 (1971).

Mesiha, M.S., et al., *Hypoglycaemic effect of oral insulin preparations containing Brij 35, 52, 58 or 92 and stearic acid*, J. Pharm. Pharmacol., vol. 33, pp. 733–734 (1981).

Moghaddam, Amir, *Use of polyethylene glycol polymers for bioconjugations and drug development*, American Biotechnology Laboratory, pp. 42, 44 (Jul. 2001).

Neubauer, H. Paul, et al., *Influence of Polyethylene Glycol Insulin on Lipid Tissues of Experimental Animals*, Diabetes, vol. 32, pp. 953–958 (Oct. 1983).

Shen, Wei–Chiang, et al., *(C) Means to Enhance Penetration; (3) Enhancement of polypeptide and protein absorption by macromolecular carriers via endocytosis and transcytosis*, Advanced Drug Delivery Reviews, vol. 8, pp. 93–113 (1992).

Sirokman, Geza, et al., *Refolding and proton pumping activity of a polyethylene glycol–bacteriorhodopsin water–soluble conjugate*, Protein Science, vol. 2, pp. 1161–1170 (1993).

Torchilin, Vladimir P., *Immunoliposomes and PEGylated Immunoliposomes: Possible Use for Targeted Delivery of Imaging Agents*, Immunomethods, vol. 4, pp. 244–258 (1994).

Wei, Jiang, et al., *A Poly(Ethylene Glycol) Water–soluble Conjugate of Porin: Refolding to the Native State*, Biochemistry, vol. 34, pp. 6408–6415 (1995).

Xia, Jiding, et al., *Effects of polyoxyethylene chain length distribution on the interfacial properties of polyethylene glycol n–dodecyl ether*, Yingyong Huaxue, vol. 2, No. 4, pp. 59–65 (Abstract Only) (1985).

Zalipsky, Samuel, et al., *Peptide Attachment to Extremities of Liposomal Surface Grafted PEG Chains: Preparation of the Long–Circulating Form of Laminin Pentapeptide, YIGSR*, Bioconjugate Chem., vol. 6, pp. 705–708 (1995).

Liu et al. "Glucose–Induced Release of Glycosylpoly(ethylene glycol) Insulin Bound to a Soluble Conjugate of Concanavalin A" *Bioconjugate Chem.* 8:664–672 (1997).

METHODS OF SYNTHESIZING SUBSTANTIALLY MONODISPERSED MIXTURES OF POLYMERS HAVING POLYETHYLENE GLYCOL MOIETIES

FIELD OF THE INVENTION

The present invention relates to methods of synthesizing polymeric compounds, and more particularly, to methods of synthesizing polymeric compounds comprising polyethylene glycol moieties.

BACKGROUND OF THE INVENTION

Polyethylene glycol (PEG) is used in a wide variety of applications including, but not limited to, plasticizers, softeners, humectants, ointments, polishes, paper coating, mold lubricants, bases for cosmetics and pharmaceuticals, solvents, binders, metal and rubber processing, and additives to foods and animal feed. Some particular uses of PEG in pharmaceutical applications include, for example, formation of PEG-drug conjugates, treatment of neonatal respiratory distress syndrome, treatment of functional and/or chronic constipation, treatment of encopresis in children, and diagnosis and therapy of gastrointestinal diseases.

PEG is typically produced by base-catalyzed ring-opening polymerization of ethylene oxide. The reaction is initiated by adding ethylene oxide to ethylene glycol, with potassium hydroxide as catalyst. This process results in a polydispersed mixture of polyethylene glycol polymers having a molecular weight within a given range of molecular weights. For example, PEG products offered by Sigma-Aldrich of Milwaukee, Wis. are provided in polydispersed mixtures such as PEG 400 ($M_n$ 380–420); PEG 1,000 ($M_n$ 950–1,050); PEG 1,500 ($M_n$ 1,400–1,600); and PEG 2,000 ($M_n$ 1,900–2,200).

In J. Milton Harris, *Laboratory Synthesis of Polyethylene Glycol Derivatives*, 25(3) Rev. Macromol. Chem. Phys. 325–373 (1985), the author discusses synthesis of monomethyl ethers of PEG (also known as methyl-terminated PEG or mPEG). The reference states that mPEG contains a significant amount (as much as 25%; from size exclusion chromatography) of PEG without the methoxy end group. This PEG "impurity" may result from water present in the polymerization process. Under basic conditions, hydroxide is produced, which yields PEG upon reaction with the ethylene oxide monomer. Since the hydroxide-initiated PEG chain can grow at both ends, while the methoxide-initiated chain can grow from only one end, the resulting mixture has a broader molecular weight distribution than that for the PEG's.

While these polydispersed mixtures of PEGs and/or mPEGs may be useful for some applications, physical properties of polymers may vary with the length of the polymer. Thus, polydispersed mixtures may not be suitable for certain applications that require specific physical properties. Additionally, the heterogeneity of commercially available PEGs and mPEGs may complicate spectroscopic analysis, physico-chemical characterization and pharmacokinetics analysis. As a result, it is desirable to provide monodispersed mixtures of PEGs and/or mPEGs.

Monodispersed mixtures of PEG and/or mPEG polymers may be provided by various organic synthesis routes. For example, in Yiyan Chen & Gregory L. Baker, *Synthesis and Properties of ABA Amphiphiles*, 64 J. Org. Chem. 6870–6873 (1999), the authors propose the following scheme:

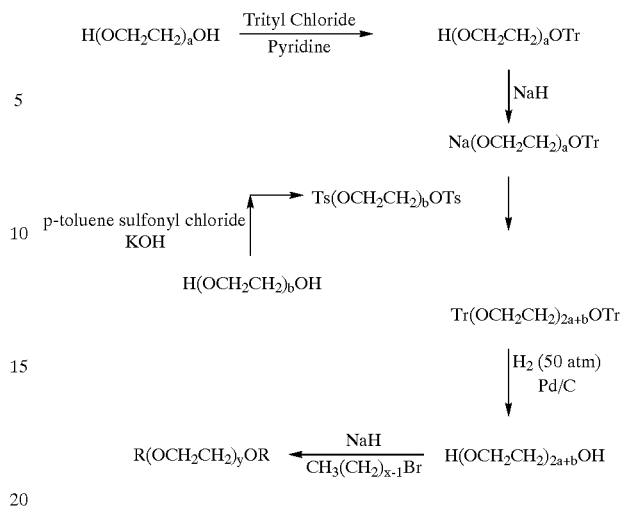

This synthesis route may be inconvenient due to the number of steps required as well as the use of undesirable reaction conditions such as high temperatures that may actually break down the PEG polymer. Moreover, it may be difficult to purify the product as the starting material may always be present in the reaction mixture.

In Gérard Coudert et al., *A Novel, Unequivocal Synthesis of Polyethylene Glycols*, Synthetic Communications, 16(1): 19–26 (1986), the authors proposed the following synthesis route:

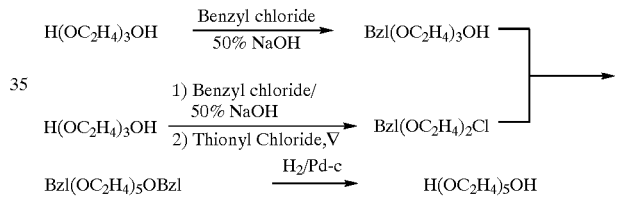

This synthesis route may be inconvenient due to the undesirable reaction conditions, which do not lead to mPEG.

As a result, it is desirable to provide a new route for synthesizing PEG, mPEG, and/or polymers comprising a PEG moiety that are more efficient and do not require such undesirable reaction conditions.

SUMMARY OF THE INVENTION

Embodiments of the present invention provide improved methods for synthesizing substantially monodispersed mixtures of polymers comprising polyethylene glycol moieties. Methods according to embodiments of the present invention may utilize reaction conditions that are milder than those required by the conventional methods described above. For example, many, if not all, of the steps of methods according to embodiments of the present invention may be carried out at atmospheric pressure and/or at room temperature. The ability to perform these steps at atmospheric pressure and/or temperature may reduce or prevent the formation of undesirable side products. Additionally, methods according to embodiments of the present invention may be more efficient than the conventional methods described above. For example, methods according to embodiments of the present invention may require fewer steps and/or less time than the conventional methods described above. Methods according to embodiments of the present invention may provide the ability to remove PEG starting materials from the products comprising polyethylene glycol moieties to provide substantially monodispersed mixtures of polymers comprising polyethylene glycol moieties.

According to embodiments of the present invention, a method of synthesizing a substantially monodispersed mixture of polymers comprising polyethylene glycol moieties includes:

reacting a substantially monodispersed mixture of compounds having the structure of Formula I:

wherein $R^1$ is H or a lipophilic moiety; n is from 1 to 25; and $X^+$ a positive ion, with a substantially monodispersed mixture of compounds having the structure of Formula II:

wherein $R^2$ is H or a lipophilic moiety; and m is from 1 to 25, under conditions sufficient to provide a substantially monodispersed mixture of polymers comprising polyethylene glycol moieties and having the structure of Formula III:

Methods according to embodiments of the present invention may provide more efficient synthesis routes for substantially monodispersed mixtures of PEGs, substantially monodispersed mixtures of mPEGs and/or substantially monodispersed mixtures of polymers comprising PEG moieties. Methods of the present invention may reduce the number of steps and/or reduce the overall synthesis time compared to conventional methods of synthesizing PEG polymers. Methods of the present invention may also utilize milder reaction conditions than those used in conventional methods.

DETAILED DESCRIPTION OF PREFERRED EMBODIMENTS

Figure 1:
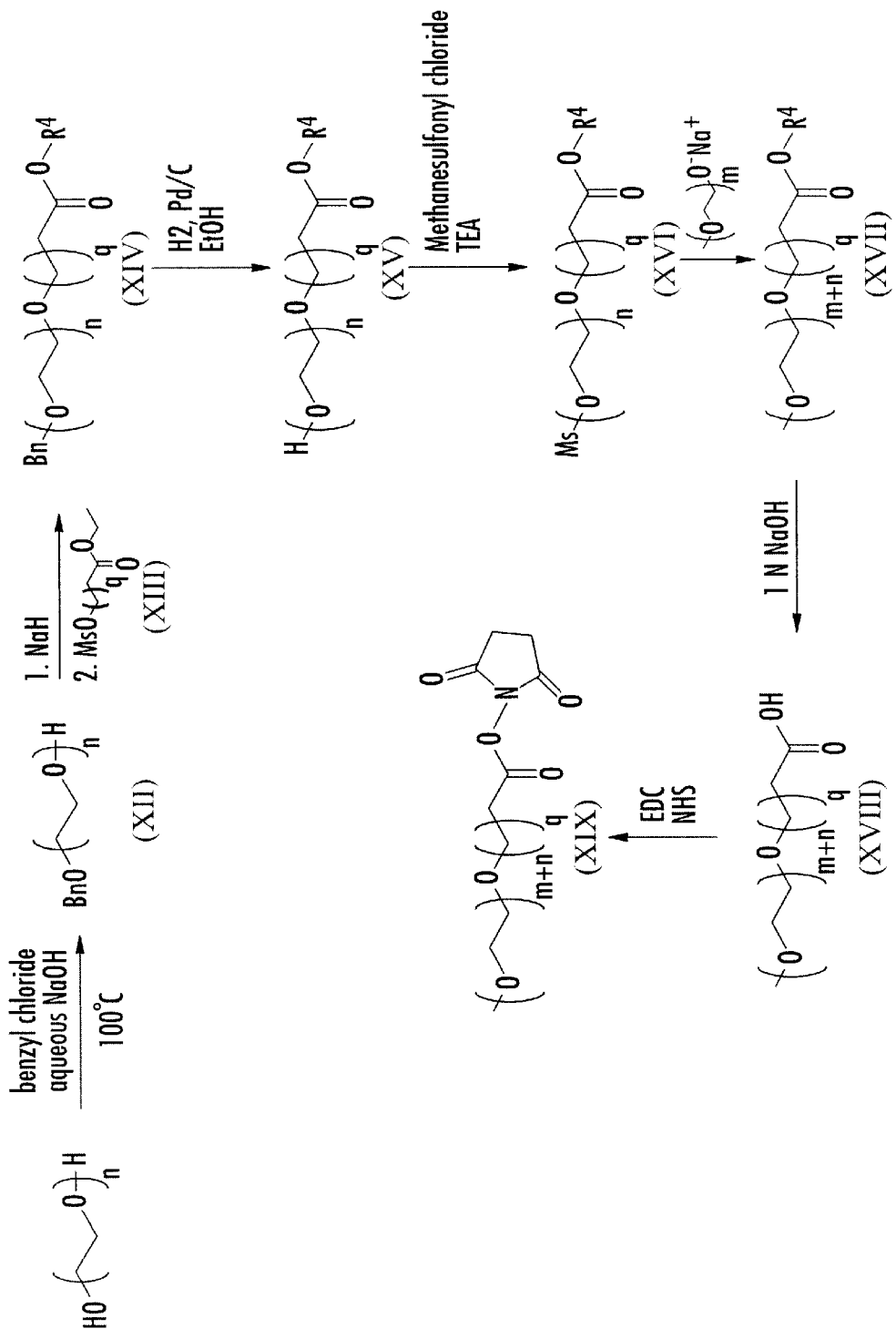
FIG. 1 illustrates a generic scheme for synthesizing a mixture of activated polymers comprising a polyethylene glycol moiety and a fatty acid moiety according to embodiments of the present invention.

The invention will now be described with respect to preferred embodiments described herein. It should be appreciated however that these embodiments are for the purpose of illustrating the invention, and are not to be construed as limiting the scope of the invention as defined by the claims.

As used herein, the term "non-polydispersed" is used to describe a mixture of compounds having a dispersity that is in contrast to the polydispersed mixtures of PEG products offered by Sigma-Aldrich of Milwaukee, Wis. such as PEG 400 ($M_n$ 380–420); PEG 1,000 ($M_n$ 950–1,050); PEG 1,500 ($M_n$ 1,400–1,600); and PEG 2,000 ($M_n$ 1,900–2,200).

As used herein, the term "substantially monodispersed" is used to describe a mixture of compounds wherein at least about 95 percent of the compounds in the mixture have the same molecular weight.

As used herein, the term "monodispersed" is used to describe a mixture of compounds wherein about 100 percent of the compounds in the mixture have the same molecular weight.

As used herein, the term "weight average molecular weight" is defined as the sum of the products of the weight fraction for a given molecule in the mixture times the mass of the molecule for each molecule in the mixture. The "weight average molecular weight" is represented by the symbol $M_w$.

As used herein, the term "number average molecular weight" is defined as the total weight of a mixture divided by the number of molecules in the mixture and is represented by the symbol $M_n$.

As used herein, the term "PEG" refers to straight or branched polyethylene glycol polymers, and includes the monomethylether of polyethylene glycol (mPEG). The terms "PEG subunit" and polyethylene glycol subunit refer to a single polyethylene glycol unit, i.e., $-(CH_2CH_2O)-$.

As used herein, the term "lipophilic" means the ability to dissolve in lipids and/or the ability to penetrate, interact with and/or traverse biological membranes, and the term, "lipophilic moiety" or "lipophile" means a moiety which is lipophilic and/or which, when attached to another chemical entity, increases the lipophilicity of such chemical entity. Examples of lipophilic moieties include, but are not limited to, alkyls, fatty acids, esters of fatty acids, cholesteryl, adamantyl and the like.

As used herein, the term "lower alkyl" refers to substituted or unsubstituted alkyl moieties having from 1 to 5 carbon atoms.

As used herein, the term "higher alkyl" refers to substituted or unsubstituted alkyl moieties having 6 or more carbon atoms.

According to aspects of the present invention, a substantially monodispersed mixture of polymers comprising polyethylene glycol moieties is provided as illustrated in reaction 1:

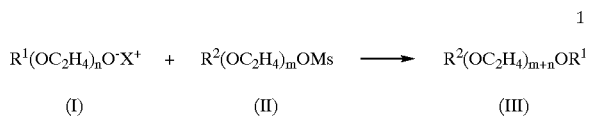

$R^1$ is H or a lipophilic moiety. $R^1$ is preferably H, alkyl, aryl alkyl, an aromatic moiety, a fatty acid moiety, an ester of a fatty acid moiety, cholesteryl, or adamantyl. $R^1$ is more preferably H, lower alkyl, or an aromatic moiety. $R^1$ is most preferably H, methyl, or benzyl.

The value of n is from 1 to 25. Preferably n is from 1 to 6.

$X^+$ a positive ion. Preferably $X^+$ any positive ion in a compound, such as a strong base, that is capable of ionizing a hydroxyl moiety on PEG. Examples of positive ions include, but are not limited to, sodium ions, potassium ions, lithium ions, cesium ions, and thallium ions.

$R^2$ is H or a lipophilic moiety. $R^2$ is preferably branched or linear alkyl, aryl alkyl, an aromatic moiety, a fatty acid moiety, or an ester of a fatty acid moiety. $R^2$ is more preferably lower alkyl, benzyl, a fatty acid moiety having 1 to 24 carbon atoms, or an ester of a fatty acid moiety having 1 to 24 carbon atoms. $R^2$ is most preferably methyl, a fatty acid moiety having 1 to 18 carbon atoms or an ethyl ester of a fatty acid moiety having 1 to 18 carbon atoms.

The value of m is from 1 to 25. Preferably m is from 1 to 6.

Ms is a mesylate moiety (i.e., $CH_3S(O_2)$—).

As illustrated in reaction 1, a mixture of compounds having the structure of Formula I is reacted with a mixture of compounds having the structure of Formula II to provide a mixture of polymers comprising polyethylene glycol moieties and having the structure of Formula III. The mixture of compounds having the structure of Formula I is a substantially monodispersed mixture. Preferably, at least 96, 97, 98 or 99 percent of the compounds in the mixture of compounds of Formula I have the same molecular weight, and, more preferably, the mixture of compounds of Formula I is a monodispersed mixture. The mixture of compounds of Formula II is a substantially monodispersed mixture. Preferably, at least 96, 97, 98 or 99 percent of the compounds in the mixture of compounds of Formula II have the same molecular weight, and, more preferably, the mixture of compounds of Formula II is a monodispersed mixture. The mixture of compounds of Formula III is a substantially monodispersed mixture. Preferably, at least 96, 97, 98 or 99 percent of the compounds in the mixture of compound of Formula III have the same molecular weight. More preferably, the mixture of compounds of Formula III is a monodispersed mixture.

Reaction 1 is preferably performed between about 0° C. and about 40° C., is more preferably performed between about 15° C. and about 35° C., and is most preferably performed at room temperature (approximately 25° C.).

Reaction 1 may be performed for various periods of time as will be understood by those skilled in the art. Reaction 1 is preferably performed for a period of time between about 0.25, 0.5 or 0.75 hours and about 2, 4 or 8 hours.

Reaction 1 is preferably carried out in an aprotic solvent such as, but not limited to, N,N-dimethylacetamide (DMA), N,N-dimethylformamide (DMF), dimethyl sulfoxide, hexamethylphosphoric triamide, tetrahydrofuran (THF), dioxane, diethyl ether, methyl t-butyl ether (MTBE), toluene, benzene, hexane, pentane, N-methylpyrollidinone, tetrahydronaphthalene, decahydronaphthalene, 1,2-dichlorobenzene, 1,3-dimethyl-2-imidazolidinone, or a mixture thereof. More preferably, the solvent is DMF, DMA or toluene.

The molar ratio of the compound of Formula I to the compound of Formula II is preferably greater than about 1:1. More preferably, the molar ratio is at least about 2:1. By providing an excess of the compounds of Formula I, one can ensure that substantially all of the compounds of Formula II are reacted, which may aid in the recovery of the compounds of Formula III as discussed below.

Compounds of Formula I are preferably prepared as illustrated in reaction 2:

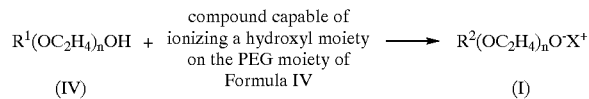

$R^1$ and $X^+$ are as described above and the mixture of compounds of Formula IV is substantially monodispersed; preferably, at least 96, 97, 98 or 99 percent of the compounds in the mixture of compounds of Formula IV have the same molecular weight; and, more preferably, the mixture of compounds of Formula IV is a monodispersed mixture.

Various compounds capable of ionizing a hydroxyl moiety on the PEG moiety of the compound of Formula IV will be understood by those skilled in the art. The compound capable of ionizing a hydroxyl moiety is preferably a strong base. More preferably, the compound capable of ionizing a hydroxyl moiety is selected from the group consisting of sodium hydride, potassium hydride, sodium t-butoxide, potassium t-butoxide, butyl lithium (BuLi), and lithium diisopropylamine. The compound capable of ionizing a hydroxyl moiety is more preferably sodium hydride.

The molar ratio of the compound capable of ionizing a hydroxyl moiety on the PEG moiety of the compound of Formula IV to the compound of Formula IV is preferably at least about 1:1, and is more preferably at least about 2:1. By providing an excess of the compound capable of ionizing the hydroxyl moiety, it is assured that substantially all of the compounds of Formula IV are reacted to provide the compounds of Formula I. Thus, separation difficulties, which may occur if both compounds of Formula IV and compounds of Formula I were present in the reaction product mixture, may be avoided.

Reaction 2 is preferably performed between about 0° C. and about 40° C., is more preferably performed between about 0° C. and about 35° C., and is most preferably performed between about 0° C. and room temperature (approximately 25° C.).

Reaction 2 may be performed for various periods of time as will be understood by those skilled in the art. Reaction 2 is preferably performed for a period of time between about 0.25, 0.5 or 0.75 hours and about 2, 4 or 8 hours.

Reaction 2 is preferably carried out in an aprotic solvent such as, but not limited to, N,N-dimethylacetamide (DMA), N,N-dimethylformamide (DMF), dimethyl sulfoxide, hexamethylphosphoric triamide, tetrahydrofuran (THF), dioxane, diethyl ether, methyl t-butyl ether (MTBE), toluene, benzene, hexane, pentane, N-methylpyrollidinone, dichloromethane, chloroform, tetrahydronaphthalene, decahydronaphthalene, 1,2-dichlorobenzene, 1,3-dimethyl-2-imidazolidinone, or a mixture thereof. More preferably, the solvent is DMF, dichloromethane or toluene.

Compounds of Formula II are preferably prepared as illustrated in reaction 3:

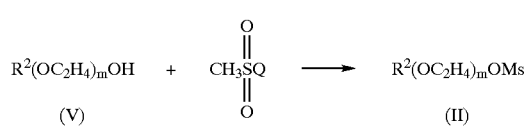

$R^2$ and Ms are as described above and the compound of Formula V is present as a substantially monodispersed mixture of compounds of Formula V; preferably at least 96, 97, 98 or 99 percent of the compounds in the mixture of compounds of Formula V have the same molecular weight; and, more preferably, the mixture of compounds of Formula V is a monodispersed mixture.

Q is a halide, preferably chloride or fluoride.

$CH_3S(O_2)Q$ is methanesulfonyl halide. The methanesulfonyl halide is preferably methanesulfonyl chloride or methanesulfonyl fluoride. More preferably, the methanesulfonyl halide is methanesulfonyl chloride.

The molar ratio of the methane sulfonyl halide to the compound of Formula V is preferably greater than about 1:1, and is more preferably at least about 2:1. By providing an excess of the methane sulfonyl halide, it is assured that substantially all of the compounds of Formula V are reacted to provide the compounds of Formula II. Thus, separation difficulties, which may occur if both compounds of Formula V and compounds of Formula II were present in the reaction product mixture, may be avoided.

Reaction 3 is preferably performed between about −10° C. and about 40° C., is more preferably performed between about 0° C. and about 35° C., and is most preferably performed between about 0° C. and room temperature (approximately 25° C.).

Reaction 3 may be performed for various periods of time as will be understood by those skilled in the art. Reaction 3 is preferably performed for a period of time between about 0.25, 0.5 or 0.75 hours and about 2, 4 or 8 hours.

Reaction 3 is preferably carried out in the presence of an aliphatic amine including, but not limited to, monomethylamine, dimethylamine, trimethylamine, monoethylamine, diethylamine, triethylamine, monoisopropylamine, diisopropylamine, mono-n-butylamine, di-n-butylamine, tri-n-butylamine, monocyclohexylamine, dicyclohexylamine, or mixtures thereof. More preferably, the aliphatic amine is a tertiary amine such as triethylamine.

As will be understood by those skilled in the art, various substantially monodispersed mixtures of compounds of Formula V are commercially available. For example, when $R^2$ is H or methyl, the compounds of Formula V are PEG or mPEG compounds, respectively, which are commercially available from Aldrich of Milwaukee, Wis.; Fluka of Switzerland, and/or TC1 America of Portland, Oreg.

When $R^2$ is a lipophilic moiety such as, for example, higher alkyl, fatty acid, an ester of a fatty acid, cholesteryl, or adamantyl, the compounds of Formula V may be provided by various methods as will be understood by those skilled in the art. The compounds of Formula V are preferably provided as follows:

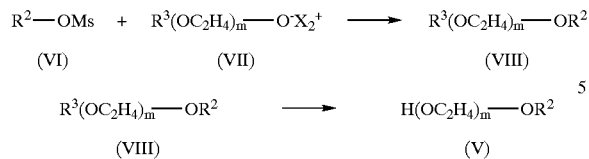

$R^2$ is a lipophilic moiety, preferably higher alkyl, fatty acid ester, cholesteryl, or adamantyl, more preferably a lower alkyl ester of a fatty acid, and most preferably an ethyl ester of a fatty acid having from 1 to 18 carbon atoms.

$R^3$ is H, benzyl, trityl, tetrahydropyran, or other alcohol protecting groups as will be understood by those skilled in the art.

$X_2^+$ is a positive ion as described above with respect to $X^+$.

The value of m is as described above.

Regarding reaction 4, a mixture of compounds of Formula VI is reacted with a mixture of compounds of Formula VII under reaction conditions similar to those described above with reference to reaction 1. The mixture of compounds of Formula VI is a substantially monodispersed mixture. Preferably, at least 96, 97, 98 or 99 percent of the compounds in the mixture of compounds of Formula VI have the same molecular weight. More preferably, the mixture of compounds of Formula VI is a monodispersed mixture. The mixture of compounds of Formula VII is a substantially monodispersed mixture. Preferably, at least 96, 97, 98 or 99 percent of the compounds in the mixture of compounds of Formula VII have the same molecular weight. More preferably, the mixture of compounds of Formula VII is a monodispersed mixture.

Regarding reaction 5, the compound of Formula VIII may be hydrolyzed to convert the $R^3$ moiety into an alcohol by various methods as will be understood by those skilled in the art. When $R^3$ is benzyl or trityl, the hydrolysis is preferably performed utilizing $H_2$ in the presence of a palladium-charcoal catalyst as is known by those skilled in the art. Of course, when $R^3$ is H, reaction 5 is unnecessary.

The compound of Formula VI may be commercially available or be provided as described above with reference to reaction 3. The compound of Formula VII may be provided as described above with reference to reaction 2.

Substantially monodispersed mixtures of polymers comprising PEG moieties and having the structure of Formula III above can further be reacted with other substantially monodispersed polymers comprising PEG moieties in order to extend the PEG chain. For example, the following scheme may be employed:

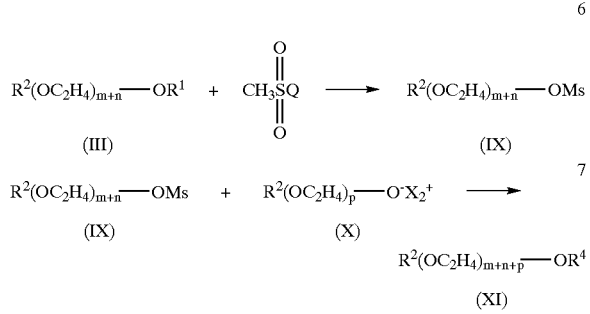

Ms, m and n are as described above with reference to reaction 1; p is similar to n and m, and $X_2^+$ is similar to $X^+$ as described above with reference to reaction 1. Q is as described above with reference to reaction 3. $R^2$ is as described above with reference to reaction 1 and is preferably lower alkyl. $R^1$ is H. Reaction 6 is preferably performed in a manner similar to that described above with reference to reaction 3. Reaction 7 is preferably performed in a manner similar to that described above with reference to reaction 1. Preferably, at least 96, 97, 98 or 99 percent of the compounds in the mixture of compounds of Formula III have the same molecular weight, and, more preferably, the mixture of compounds of Formula III is a monodispersed mixture. The mixture of compounds of Formula X is a substantially monodispersed mixture. Preferably, at least 96, 97, 98 or 99 percent of the compounds in the mixture of compounds of Formula X have the same molecular weight, and, more preferably, the mixture of compounds of Formula X is a monodispersed mixture.

An embodiment of a method according to the present invention is illustrated by the scheme shown in FIG. 1, which will now be described. The synthesis of a substantially monodispersed mixture of polyethylene glycol-containing oligomers begins by the preparation of the monobenzyl ether (XII) of a substantially monodispersed mixture of polyethylene glycol. An excess of a commercially available substantially monodispersed mixture of polyethylene glycol is reacted with benzyl chloride in the presence of aqueous sodium hydroxide as described by Coudert et al (*Synthetic Communications*, 16(1): 19–26 (1986)). The sodium salt of XII is then prepared by the addition of NaH, and this sodium salt is allowed to react with the mesylate synthesized from the ester of a hydroxyalkanoic acid (XIII). The product (XIV) of the displacement of the mesylate is debenzylated via catalytic hydrogenation to obtain the alcohol (XV). The mesylate (XVI) of this alcohol may be prepared by addition of methanesulfonyl chloride and used as the electrophile in the reaction with the sodium salt of the monomethyl ether of a substantially monodispersed mixture of a polyethylene glycol derivative, thereby extending the polyethylene glycol portion of the oligomer to the desired length, obtaining the elongated ester (XVII). The ester may be hydrolyzed to the acid (XVIII) in aqueous base and transformed into the activated ester (XIX) by reaction with a carbodiimide and N-hydroxysuccinimide. While the oligomer illustrated in FIG. 1 is activated using N-hydroxysuccinimide, it is to be understood that various other reagents may be used to activate oligomers of the present invention including, but not limited to, active phenyl chloroformates such as para-nitrophenyl chloroformate, phenyl chloroformate, and 3,4-phenyldichloroformate; tresylation; and acetal formation.

Still referring to FIG. 1, q is from 1 to 24. Preferably, q is from 1 to 18, and q is more preferably from 4 to 16. $R^4$ is a moiety capable of undergoing hydrolysis to provide the carboxylic acid. $R^4$ is preferably lower alkyl and is more preferably ethyl. The variables n and m are as described above with reference to reaction 1.

All starting materials used in the procedures described herein are either commercially available or can be prepared by methods known in the art using commercially available starting materials.

The present invention will now be described with reference to the following examples. It should be appreciated that these examples are for the purposes of illustrating aspects of the present invention, and do not limit the scope of the invention as defined by the claims.

EXAMPLES

Figure 2:
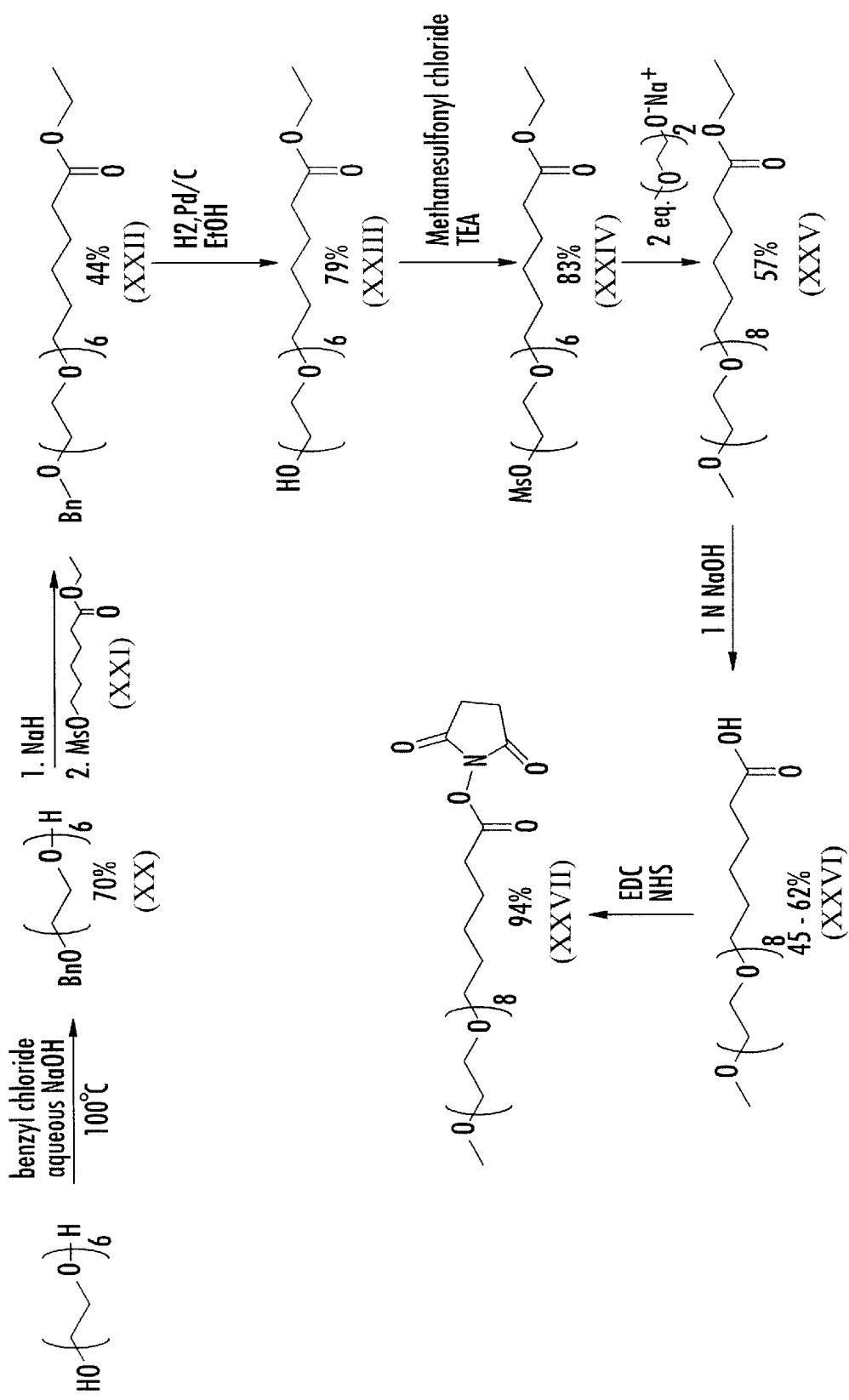
FIG. 2 illustrates a scheme for synthesizing a mixture of activated mPEG7-hexyl oligomers according to embodiments of the present invention.

Examples 1 through 6 refer to the scheme illustrated in FIG. 2.

Example 1

Hexaethylene glycol monobenzyl ether (XX)

An aqueous sodium hydroxide solution prepared by dissolving 3.99 g (100 mmol) NaOH in 4 ml water was added slowly to non-polydispersed hexaethylene glycol (28.175 g, 25 ml, 100 mmol). Benzyl chloride (3.9 g, 30.8 mmol, 3.54 ml) was added and the reaction mixture was heated with stirring to 100° C. for 18 hours. The reaction mixture was then cooled, diluted with brine (250 ml) and extracted with methylene chloride (200 ml×2). The combined organic layers were washed with brine once, dried over $Na_2SO_4$, filtered and concentrated in vacuo to a dark brown oil. The crude product mixture was purified via flash chromatography (silica gel, gradient elution:ethyl acetate to 9/1 ethyl acetate/methanol) to yield 8.099 g (70%) of non-polydispersed XX as a yellow oil.

Example 2

Ethyl 6-methylsulfonyloxyhexanoate (XXI)

A solution of non-polydispersed ethyl 6-hydroxyhexanoate (50.76 ml, 50.41 g, 227 mmol) in dry dichloromethane (75 ml) was chilled in a ice bath and placed under a nitrogen atmosphere. Triethylamine (34.43 ml, 24.99 g, 247 mmol) was added. A solution of methanesulfonyl chloride (19.15 ml, 28.3 g, 247 mmol) in dry dichloromethane (75 ml) was added dropwise from an addition funnel. The mixture was stirred for three and one half hours, slowly being allowed to come to room temperature as the ice bath melted. The mixture was filtered through silica gel, and the filtrate was washed successively with water, saturated $NaHCO_3$, water and brine. The organics were dried over $Na_2SO_4$, filtered and concentrated in vacuo to a pale yellow oil. Final purification of the crude product was achieved by flash chromatography (silica gel, 1/1 hexanes/ethyl acetate) to give the non-polydispersed product (46.13 g, 85%) as a clear, colorless oil. FAB MS: m/e 239 (M+H), 193 (M—$C_2H_5O$).

Example 3

6-{2-[2-(2-{2-[2-(2-Benzyloxyethoxy)ethoxy] ethoxy}-ethoxy)-ethoxy]-ethoxy}-hexanoic acid ethyl ester (XXII)

Sodium hydride (3.225 g or a 60% oil dispersion, 80.6 mmol) was suspended in 80 ml of anhydrous toluene, placed under a nitrogen atmosphere and cooled in an ice bath. A solution of the non-polydispersed alcohol XX (27.3 g, 73.3 mmol) in 80 ml dry toluene was added to the NaH suspension. The mixture was stirred at 0° C. for thirty minutes, allowed to come to room temperature and stirred for another five hours, during which time the mixture became a clear brown solution. The non-polydispersed mesylate XXI (19.21 g, 80.6 mmol) in 80 ml dry toluene was added to the NaH/alcohol mixture, and the combined solutions were stirred at room temperature for three days. The reaction mixture was quenched with 50 ml methanol and filtered through basic alumina. The filtrate was concentrated in vacuo and purified by flash chromatography (silica gel, gradient elution: 3/1 ethyl acetate/hexanes to ethyl acetate) to yield the non-polydispersed product as a pale yellow oil (16.52 g, 44%). FAB MS: m/e 515 (M+H).

Example 4

6-{2-[2-(2-{2-[2-(2-hydroxyethoxy)ethoxy]ethoxy}-ethoxy)-ethoxy]-ethoxy}-hexanoic acid ethyl ester (XXIII)

Non-polydispersed benzyl ether XI (1.03 g, 2.0 mmol) was dissolved in 25 ml ethanol. To this solution was added 270 mg 10% Pd/C, and the mixture was placed under a hydrogen atmosphere and stirred for four hours, at which time TLC showed the complete disappearance of the starting material. The reaction mixture was filtered through Celite 545 to remove the catalyst, and the filtrate was concentrated in vacuo to yield the non-polydispersed title compound as a clear oil (0.67 g, 79%). FAB MS: m/e 425 (M+H), 447 (M+Na).

Example 5

6-{2-[2-(2-{2-[2-(2-methylsulfonylethoxy)ethoxy] ethoxy}-ethoxy)-ethoxy]-ethoxy}-hexanoic acid ethyl ester (XXIV)

The non-polydispersed alcohol XXIII (0.835 g, 1.97 mmol) was dissolved in 3.5 ml dry dichloromethane and placed under a nitrogen atmosphere. Triethylamine (0.301 ml, 0.219 g, 2.16 mmol) was added and the mixture was chilled in an ice bath. After two minutes, the methanesulfonyl chloride (0.16 ml, 0.248 g, 2.16 mmol) was added. The mixture was stirred for 15 minutes at 0° C., then at room temperature for two hours. The reaction mixture was filtered through silica gel to remove the triethylammonium chloride, and the filtrate was washed successively with water, saturated NaHCO$_3$, water and brine. The organics were dried over Na$_2$SO$_4$, filtered and concentrated in vacuo. The residue was purified by column chromatography (silica gel, 9/1 ethyl acetate/methanol) to give non-polydispersed XXIV as a clear oil (0.819 g, 83%). FAB MS: m/e 503 (M+H).

Example 6

8-[2-(2-{2-[-2-(2-{2[-2-(2-methoxyethoxy)ethoxy]-ethoxy}-ethoxy)-ethoxy]-ethoxy}-ethoxy)-ethoxy]-hexanoic acid ethyl ester (XXV)

NaH (88 mg of a 60% dispersion in oil, 2.2 mmol) was suspended in anhydrous toluene (3 ml) under N$_2$ and chilled to 0° C. Non-polydispersed diethylene glycol monomethyl ether (0.26 ml, 0.26 g, 2.2 mmol) that had been dried via azeotropic distillation with toluene was added. The reaction mixture was allowed to warm to room temperature and stirred for four hours, during which time the cloudy grey suspension became clear and yellow and then turned brown. Non-polydispersed mesylate XXIV (0.50 g, 1.0 mmol) in 2.5 ml dry toluene was added. After stirring at room temperature over night, the reaction was quenched by the addition of 2 ml of methanol and the resultant solution was filtered through silica gel. The filtrate was concentrated in vacuo and the FAB MS: m/e 499 (M+H), 521 (M+Na). Additional purification by preparatory chromatography (silica gel, 19/3 chloroform/methanol) provided the non-polydispersed product as a clear yellow oil (0.302 g 57%). FAB MS: m/e 527 (M+H), 549 (M+Na).

Example 7

8-[2-(2-{2-[2-(2-{2-[2-(2-methoxyethoxy)ethoxy]-ethoxy}-ethoxy)-ethoxy]-ethoxy}-ethoxy)-ethoxy]-hexanoic acid (XXVI)

Non-polydispersed ester XXV (0.25 g, 0.46 mmol) was stirred for 18 hours in 0.71 ml of 1 N NaOH. After 18 hours, the mixture was concentrated in vacuo to remove the alcohol and the residue dissolved in a further 10 ml of water. The aqueous solution was acidified to pH 2 with 2 N HCl and the product was extracted into dichloromethane (30 ml×2). The combined organics were then washed with brine (25 ml×2), dried over Na$_2$SO$_4$, filtered and concentrated in vacuo to yield the non-polydispersed title compound as a yellow oil (0.147 g, 62%). FAB MS: m/e 499 (M+H), 521 (M+Na).

Example 8

8-[2-(2-{2-[2-(2-{2-[2-(2-methoxyethoxy)ethoxy]-ethoxy}-ethoxy)-ethoxy]-ethoxy}-ethoxy)-ethoxy]-hexanoic acid 2,5-dioxo-pyrrolidin-1-yl ester (XXVII)

Non-polydispersed acid XXVI (0.209 g, 0.42 mmol) were dissolved in 4 ml of dry dichloromethane and added to a dry flask already containing NHS (N-hydroxysuccinimide) (57.8 mg, 0.502 mmol) and EDC (1-(3-dimethylaminopropyl)-3-ethylcarbodiimide hydrochloride) (98.0 mg, 0.502 mmol) under a N$_2$ atmosphere. The solution was stirred at room temperature overnight and filtered through silica gel to remove excess reagents and the urea formed from the EDC. The filtrate was concentrated in vacuo to provide the non-polydispersed product as a dark yellow oil (0.235 g, 94%). FAB MS: m/e 596 (M+H), 618 (M+Na).

Examples 9 through 18

Figure 3:
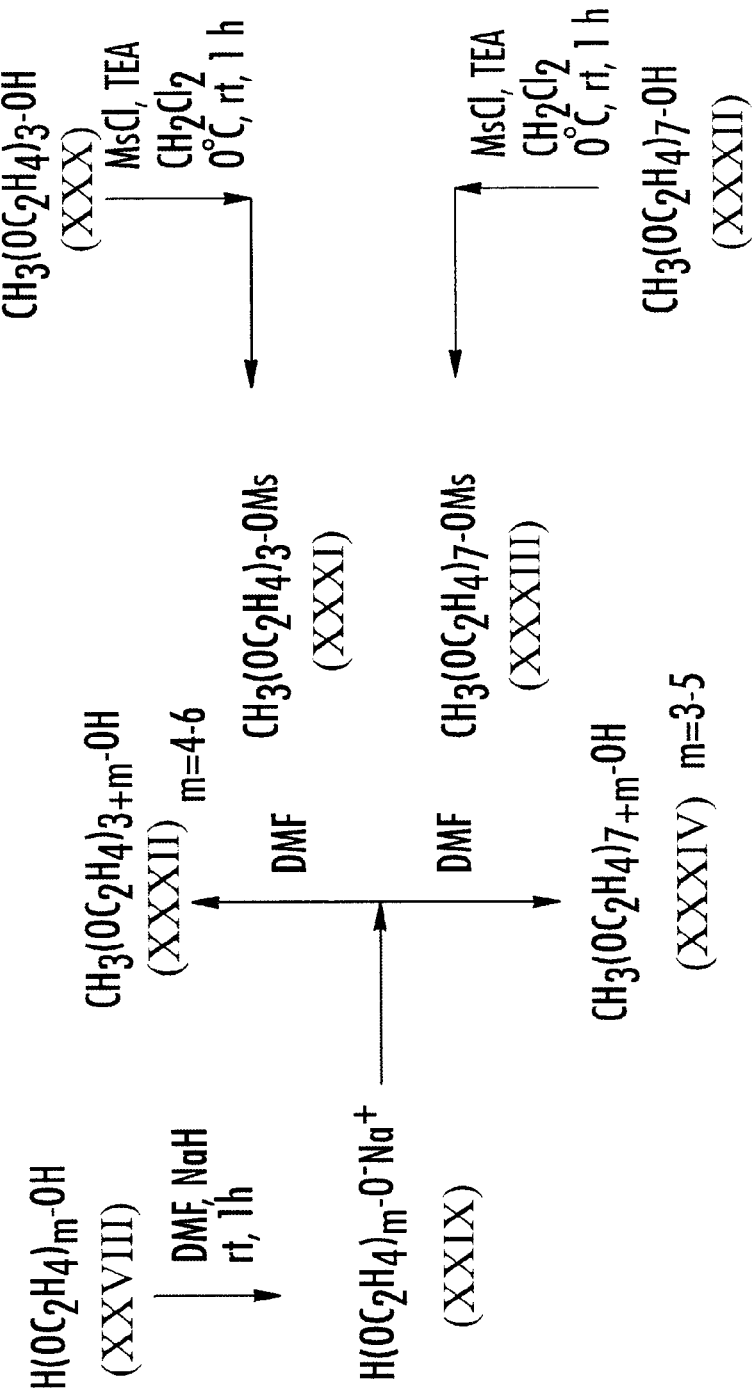
FIG. 3 illustrates a scheme for synthesizing a mixture of mPEG according to embodiments of the present invention.

Reactions in Examples 8 through 17 were carried out under nitrogen with magnetic stirring, unless otherwise specified. "Work-up" denotes extraction with an organic solvent, washing of the organic phase with saturated NaCl solution, drying (MgSO$_4$), and evaporation (rotary evaporator). Thin layer chromatography was conducted with Merck glass plates precoated with silica gel 60° F.–254 and spots were visualized by iodine vapor. All mass spectra were determined by Macromolecular Resources Colorado State University, CO and are reported in the order m/z, (relative intensity). Elemental analyses and melting points were performed by Galbraith Laboratories, Inc., Knoxville, Tenn. Examples 8–17 refer to the scheme illustrated in FIG. 3.

Example 9

8-Methoxy-1-(methylsulfonyl)oxy-3,6-dioxaoctane (XXXI)

A solution of non-polydispersed triethylene glycol monomethyl ether molecules (4.00 mL, 4.19 g, 25.5 mmol) and triethylamine (4.26 mL, 3.09 g, 30.6 mmol) in dry dichloromethane (50 mL) was chilled in an ice bath and place under a nitrogen atmosphere. A solution of methanesulfonyl chloride (2.37 mL, 3.51 g, 30.6 mmol) in dry dichloromethane (20 mL) was added dropwise from an addition funnel. Ten minutes after the completion of the chloride addition, the reaction mixture was removed from the ice bath and allowed to come to room temperature. The mixture was stirred for an additional hour, at which time TLC (CHCl$_3$ with 15% MeOH as the elutant) showed no remaining triethylene glycol monomethyl ether.

The reaction mixture was diluted with another 75 mL of dichloromethane and washed successively with saturated NaHCO$_3$, water and brine. The organics were dried over Na$_2$SO$_4$, filtered and concentrated in vacuo to give non-polydispersed compound XXXI as a clear oil (5.31 g, 86%).

Example 10

Ethylene glycol mono methyl ether (XXXII) (m=4, 5,6)

To a stirred solution of non-polydispersed compound XXVIII (35.7 mmol) in dry DMF (25.7 mL), under N$_2$ was added in portion a 60% dispersion of NaH in mineral oil, and the mixture was stirred at room temperature for 1 hour. To this salt XXIX was added a solution of non-polydispersed mesylate XXXI (23.36 mmol) in dry DMF (4 ml) in a single portion, and the mixture was stirred at room temperature for 3.5 hours. Progress of the reaction was monitored by TLC (12% CH$_3$OH—CHCl$_3$). The reaction mixture was diluted with an equal amount of 1N HCl, and extracted with ethyl acetate (2×20 ml) and discarded. Extraction of aqueous solution and work-up gave non-polydispersed polymer XXXII (82–84% yield).

Example 11

3,6,9,12,15,18,21-Heptaoxadocosanol (XXXII) (m=4)

Oil; Rf 0.46 (methanol:chloroform=3:22); MS m/z calc'd for C$_{15}$H$_{32}$O$_8$ 340.21 (M$^+$+1), found 341.2.

Example 12

3,6,9,12,15,18,21,24-Octaoxapentacosanol (XXXII) (m=5)

Oil; Rf 0.43 (methanol:chloroform=6:10); MS m/z calc'd for C$_{17}$H$_{36}$O$_9$ 384.24 (M$^+$+1), found 385.3.

Example 13

3,6,9,12,15,18,21,24,27-Nonaoxaoctacosanol (XXXII) (m=5)

Oil; Rf 0.42 (methanol:chloroform=6:10); MS m/z calc'd for $C_{19}H_{40}O_{10}$ 428.26 (M$^+$+1), found 429.3.

Example 14

20-methoxy-1-(methylsulfonyl)oxy-3,6,9,12,15,18-hexaoxaeicosane (XXXIII)

Non-polydispersed compound XXXIII was obtained in quantitative yield from the alcohol XXXII (m=4) and methanesulfonyl chloride as described for XXXI, as an oil; Rf 0.4 (ethyl acetate:acetonitrile=1:5); MS m/z calc'd for $C_{17}H_{37}O_{10}$ 433.21 (M$^+$+1), found 433.469.

Example 15

Ethylene glycol mono methyl ether (XXXIV) (m=3,4,5)

The non-polydispersed compounds XXXIV were prepared from a diol by using the procedure described above for compound XXXII.

Example 16

3,6,9,12,15,18,21,24,27,30-Decaoxabenetriacontanol (XXXIV) (m=3)

Oil; Rf 0.41 (methanol:chloroform=6:10); MS m/z calc'd for $C_{21}H_{44}O_{11}$ 472.29 (M$^+$+1), found 472.29.

Example 17

3,6,9,12,15,18,21,24,27,30,33-Undecaoxatetratriacontanol (XXXIV) (m=4)

Oil; Rf 0.41 (methanol:chloroform=6:10); MS m/z calc'd for $C_{23}H_{48}O_{12}$ 516.31 (M$^+$+1), found 516.31.

Example 18

3,6,9,12,15,18,21,24,27,30,33,36-Dodecaoxaheptatricosanol (XXXIV) (m=5)

Oil; Rf 0.41 (methanol:chloroform=6:10); MS m/z calc'd for $C_{25}H_{52}O_{13}$ 560.67 (M$^+$+1), found 560.67.

In the specification, there has been disclosed typical preferred embodiments of the invention and, although specific terms are employed, they are used in a generic and descriptive sense only and not for purposes of limitation, the scope of the invention being set forth in the following claims.

What is claimed is:

1. A method of synthesizing a substantially monodispersed mixture of polymers comprising polyethylene glycol moieties, said method comprising:

reacting a substantially monodispersed mixture of compounds having the structure of Formula I:

$$R^1(OC_2H_4)_m\text{—}O^-X^+ \qquad (I)$$

wherein $R^1$ is H or a lipophilic moiety; m is from 1 to 25; and $X^+$ is a positive ion, with a substantially monodispersed mixture of compounds having the structure of Formula II:

$$R^2(OC_2H_4)_n\text{—}OMs \qquad (II)$$

wherein $R^2$ is H or a lipophilic moiety; Ms is a mesylate moiety; and n is from 1 to 25, under conditions sufficient to provide a substantially monodispersed mixture of polymers comprising polyethylene glycol moieties and having the structure of Formula III:

$$R^2(OC_2H_4)_{m+n}\text{—}OR^1 \qquad (III).$$

2. The method according to claim 1, wherein the molar ratio of the compounds of Formula I to the compounds of Formula II is greater than about 1:1.

3. The method according to claim 1, wherein the molar ratio of the compounds of Formula I to the compounds of Formula II is at least about 2:1.

4. The method according to claim 1, wherein $R^2$ is a lipophilic moiety selected such that the polymers of Formula III are substantially insoluble in water.

5. The method according to claim 1, wherein $R^2$ is a lipophilic moiety selected such that the polymers of Formula III have a Log $K_{ow}$ greater than about 0.

6. The method according to claim 1, wherein $R^2$ is a fatty acid moiety or an ester of a fatty acid moiety.

7. The method according to claim 6, wherein the fatty acid moiety or the ester of a fatty acid moiety comprises an alkyl moiety at least n carbon atoms in length.

8. The method according to claim 7, wherein the molar ratio of the compounds of Formula I to the compounds of Formula II are greater than 1:1 such that the reaction of the compounds of Formula I with the compounds of Formula II provide a mixture comprising the polymers of Formula III and an excess of compounds of Formula I, said method further comprising:

separating the excess compounds of Formula I from the polymers of Formula III.

9. The method according to claim 8, wherein the separating step comprises:

contacting the mixture of the excess compounds of Formula I and the polymers of Formula III with an aqueous medium; and collecting the polymers of Formula III.

10. The method according to claim 8, wherein the separating step comprises:

contacting the mixture of the excess compounds of Formula I and the polymers of Formula III with an organic medium;

removing the excess of compounds of Formula I from the organic medium; and recovering the polymers of Formula III from the organic medium.

11. The method according to claim 1, further comprising:

reacting a substantially monodispersed mixture of compounds having the structure of Formula V:

$$R^2(OC_2H_4)_n\text{—}OH \qquad (V)$$

with a methanesulfonyl halide under conditions sufficient to provide a substantially monodispersed mixture of compounds having the structure of Formula II:

$$R^2(OC_2H_4)_n\text{—}OMs \qquad (II).$$

12. The method according to claim 11, wherein the methanesulfonyl halide is methane sulfonyl chloride.

13. The method according to claim 11, wherein the molar ratio of the methanesulfonyl halide to the compounds of Formula V is greater than about 1:1.

14. The method according to claim 11, wherein the molar ratio of the methanesulfonyl halide to the compounds of Formula V is at least about 2:1.

15. The method according to claim 11, wherein the reacting of a substantially monodispersed mixture of compounds having a structure of Formula V with a methanesulfonyl halide to provide a substantially monodispersed mixture of compounds of Formula II is performed at a temperature between about 0° C. and about 40° C.

16. The method according to claim 11, wherein the reacting of a substantially monodispersed mixture of compounds of Formula V with a methanesulfonyl halide to provide a substantially monodispersed mixture of compounds of Formula II is performed at a temperature between about 15° C. and about 35° C.

17. The method according to claim 11, wherein the reacting of a substantially monodispersed mixture of compounds of Formula V with methane sulfonyl halide to provide a substantially monodispersed mixture compounds of Formula II is performed for a period of time between about 0.25 hours and about 2 hours.

18. The method according to claim 11, further comprising:

reacting a substantially monodispersed mixture of compounds having the structure of Formula VI:

wherein $R^2$ is a lipophilic moiety;
with a substantially monodispersed mixture of compounds having the structure of Formula VII:

wherein $R^3$ is benzyl, trityl, or trimethylsilyl; and $X_2^+$ is a positive ion; under conditions sufficient to provide a substantially monodispersed mixture of compounds having the structure of Formula VIII:

and reacting the substantially monodispersed mixture of compounds having the structure of Formula VIII under conditions sufficient to provide a substantially monodispersed mixture of compounds having the structure of Formula V:

19. The method according to claim 18, wherein $R^3$ is benzyl.

20. The method according to claim 1, further comprising:
reacting a substantially monodispersed mixture of compounds having the structure of Formula IV:

under conditions sufficient to provide a substantially monodispersed mixture of compounds having the structure of Formula I:

21. The method according to claim 20, wherein the reacting of a substantially monodispersed mixture of compounds having a structure of Formula IV under conditions sufficient to provide a substantially monodispersed mixture of compounds of Formula I comprises:

reacting a substantially monodispersed mixture of compounds having the structure of Formula IV with a compound capable of ionizing the hydroxyl moiety of the compound of Formula IV under conditions sufficient to provide the substantially monodispersed mixture of compounds having the structure of Formula I.

22. The method according to claim 21, wherein the molar ratio of the compound capable of ionizing the hydroxyl moiety to the compound of Formula I is greater than about 1:1.

23. The method according to claim 21, wherein the molar ratio of the compound capable of ionizing the hydroxyl moiety to the compound of Formula I is at least about 2:1.

24. The method according to claim 21, wherein the compound capable of ionizing the hydroxyl moiety is a strong base.

25. The method according to claim 24, wherein the strong base is selected from the group consisting of sodium hydride, potassium hydride, sodium t-butoxide, potassium t-butoxide, and sodium amide.

26. The method according to claim 24, wherein the strong base is sodium hydride.

27. The method according to claim 20, wherein the reacting of a substantially monodispersed mixture of compounds of Formula IV under conditions sufficient to provide a substantially monodispersed mixture of compounds of Formula I is performed at a temperature between about 0° C. and about 40° C.

28. The method according to claim 20, wherein the reacting of a substantially monodispersed mixture of compounds of Formula IV under conditions sufficient to provide a substantially monodispersed mixture of compounds of Formula I is performed at a temperature between about 15° C. and about 35° C.

29. The method according to claim 20, wherein the reacting of a substantially monodispersed mixture of compounds of Formula IV under conditions sufficient to provide a substantially monodispersed mixture of compounds of Formula I is performed for a period of time between about 0.25 and about 4 hours.

30. The method according to claim 1, wherein at least about 96, 97, 98 or 99 percent of the compounds in the mixture of polymers of Formula III have the same molecular weight.

31. The method according to claim 1, wherein the mixture of polymers of Formula III is a monodispersed mixture.

32. A monodispersed mixture of polymers comprising polyethylene glycol moieties, said polymers synthesized by the method of claim 1.

33. A method of synthesizing a substantially monodispersed mixture of polymers comprising polyethylene glycol moieties, said method comprising:

reacting a substantially monodispersed mixture of compounds having the structure of Formula I:

wherein $R^2$ is H or lower alkyl; m is from 1 to 25; and $X_1^+$ is a positive ion, with a substantially monodispersed mixture of compounds having the structure of Formula II:

wherein $R^2$ is H or lower alkyl; Ms is a mesylate moiety; and n is from 1 to 25, under conditions sufficient to provide a substantially monodispersed mixture of polymers comprising polyethylene glycol moieties and having the structure of Formula III:

34. The method according to claim 33, wherein m+n is at least 7.

35. The method according to claim 33, wherein $R^1$ is H and $R^2$ is methyl.

36. The method according to claim 33, further comprising:

reacting the substantially monodispersed mixture of polymers comprising polyethylene glycol moieties and having the structure of Formula III:

$$R^2(OC_2H_4)_{m+n}\text{—}OR^1 \qquad (III)$$

wherein $R^1$ is H and $R^2$ is lower alkyl, with a methane sulfonyl halide under conditions sufficient to provide a substantially monodispersed mixture of polymers having the structure of Formula IX:

$$R^2(OC_2H_4)_{m+n}\text{—}OMs \qquad (IX);$$

and reacting the substantially monodispersed mixture of polymers having the structure of Formula IX with a substantially monodispersed mixture of compounds having the structure of Formula X:

$$H(OC_2H_4)_p\text{—}O^-X_2^+ \qquad (X)$$

wherein $X_2^+$ is a positive ion; and p is from 1 to 25, under conditions sufficient to provide a substantially monodispersed mixture of polymers having the structure of Formula XI:

$$R^2(OC_2H_4)_{m+n+p}\text{—}OH \qquad (XI).$$

37. A method of synthesizing a substantially monodispersed mixture of polymers comprising polyethylene glycol moieties, said method comprising:

reacting a substantially monodispersed mixture of compounds having the structure of Formula I:

$$R^1(OC_2H_4)_m\text{—}O^-X_1^+ \qquad (I)$$

wherein $R^1$ is lower alkyl; m is from 1 to 25; and $X_1^+$ is a positive ion, with a substantially monodispersed mixture of compounds having the structure of Formula II:

$$R^2(OC_2H_4)_n\text{—}OMs \qquad (II)$$

wherein n is from 1 to 25; Ms is a mesylate moiety; and $R^2$ is an ester of a fatty acid, under conditions sufficient to provide a substantially monodispersed mixture of polymers comprising polyethylene glycol moieties and having the structure of Formula III:

$$R^2(OC_2H_4)_{m+n}\text{—}OR^1 \qquad (III).$$

38. The method according to claim 37, further comprising:

reacting the substantially monodispersed mixture of polymers having the structure of Formula III under conditions sufficient to hydrolyze the ester moiety to provide a carboxylic acid moiety.

39. The method according to claim 37, further comprising:

reacting a substantially monodispersed mixture of compounds having the structure of Formula VI:

$$R^2\text{—}OMs \qquad (VI)$$

wherein $R^2$ is an ester of a fatty acid, with a substantially monodispersed mixture of compounds having the structure of Formula VII:

$$R^3(OC_2H_4)_n\text{—}O^-X_2^+ \qquad (VII)$$

wherein $R^3$ is benzyl, trityl, or THP; n is from 1 to 25; and $X_2^+$ is a positive ion;

under conditions sufficient to provide a substantially monodispersed mixture of compounds having the structure of Formula VIII:

$$R^3(OC_2H_4)_n\text{—}OR^2 \qquad (VIII);$$

reacting the substantially monodispersed mixture of compounds having the structure of Formula VIII under conditions sufficient to provide a substantially monodispersed mixture of compounds having the structure of Formula V:

$$H(OC_2H_4)_n\text{—}OR^2 \qquad (V);$$

and reacting the substantially monodispersed mixture of compounds having the structure of Formula V under conditions sufficient to provide a substantially monodispersed mixture of compounds having the structure of Formula II.

40. The method according to claim 39, wherein $R^2$ is an ester of a fatty acid having the formula:

$$R^4O(O)C(CH_2)_q\text{—}$$

wherein $R^4$ is lower alkyl, and q is from 1 to 24.

41. The method according to claim 40, wherein $R^4$ is ethyl.

* * * * *

UNITED STATES PATENT AND TRADEMARK OFFICE
CERTIFICATE OF CORRECTION

PATENT NO. : 6,835,802 B2
DATED : December 28, 2004
INVENTOR(S) : Ekwuribe Nnochiri N.

It is certified that error appears in the above-identified patent and that said Letters Patent is hereby corrected as shown below:

Column 16,
Line 55, after the word "wherein" please delete "$R^2$" and insert -- $R^1$ --

Signed and Sealed this

Twenty-fourth Day of May, 2005

JON W. DUDAS
*Director of the United States Patent and Trademark Office*